United States Patent [19]

Schäfer

[11] 4,373,574

[45] Feb. 15, 1983

[54] METHOD AND APPARATUS FOR ALTERNATELY HEATING AND COOLING A HEAT EXCHANGER

[76] Inventor: Otmar U. Schäfer, Pienzenauerstrasse 9, 8000 München 80, Fed. Rep. of Germany

[21] Appl. No.: 160,477

[22] Filed: Jun. 18, 1980

[30] Foreign Application Priority Data

Oct. 30, 1979 [DE] Fed. Rep. of Germany ....... 2943797

[51] Int. Cl.³ .......................................... F24D 11/00
[52] U.S. Cl. ........................................ 165/2; 165/18; 165/48 R; 165/61
[58] Field of Search ...................... 165/1, 2, 18, 61, 48

[56] References Cited

U.S. PATENT DOCUMENTS

| | | | |
|---|---|---|---|
| 3,109,486 | 11/1963 | Hansen | 165/1 |
| 3,259,175 | 7/1966 | Kraus et al. | 165/61 X |
| 3,556,201 | 1/1971 | Sander | 165/2 |
| 4,020,895 | 5/1977 | Schäfer | 165/1 |
| 4,026,347 | 5/1977 | Schäfer | 165/2 |
| 4,071,075 | 1/1978 | Hinkle | 165/2 |
| 4,146,084 | 3/1979 | Hinkle | 165/2 |

*Primary Examiner*—Samuel Scott
*Assistant Examiner*—Margaret A. Focarino

[57] ABSTRACT

A method and installation for alternately heating and cooling a heat exchanger adding at least two liquid storage vessels respectively at higher and lower average temperature and a conduit system and a boiler. Prior to the last heating-up stage of the heat exchanger the liquid heat carrier present in the heat exchanger and in a portion of the conduit system is pressed into a liquid storage vessel with variable liquid level. For the further heating-up and heating of the heat exchanger, steam from a steam boiler is fed into the heat exchanger and during cooling-off of the heat exchanger the latter and the portion of the conduit system mentioned above is first filled with liquid from the liquid storage vessel of variable liquid level.

5 Claims, 8 Drawing Figures

METHOD AND APPARATUS FOR ALTERNATELY HEATING AND COOLING A HEAT EXCHANGER

BACKGROUND OF THE INVENTION

The present invention relates to a method for the alternate heating and cooling of a heat exchanger, such as a press or a reaction vessel, and also relates to a heating and cooling system in which the method can be carried out.

A method and apparatus for heating and cooling a heat exchanger of this type is, for instance, described in U.S. Pat. No. 3,556,201. Oil having a boiling point above the operating temperature of the apparatus is used as the liquid heat carrier. With certain additional costs, this known method can also be operated with liquid heat carriers the boiling point of which is below the maximum operating temperature, such as for instance, hot water.

Regardless of the type of liquid heat carrier, the capital costs for the heating and cooling apparatus are very high. With liquids having a high boiling point, such as oil, the large volume of the vessels, the armatures or fittings, the pumps, as well as the volume of the liquid itself, have a very strong tendencey to raise the costs. In addition, high-boiling liquids have only about fifty percent (50%) of the specific heat compared with water. When using water as the liquid heat carrier, the armatures, pumps and containers may be dimensioned somewhat smaller, but the necessary high operating pressure is disadvantageous as far as capital costs are concerned.

Aside from the capital costs for the heating and cooling apparatus for carrying out the above described known method, such method requires operating steps which are unsatisfactory regarding consumption of heat. The considerable volume of the liquid heat carrier is present in the passages of the heating plates of the press, the distributers, hoses and connecting pipes, which volume has to be heated and cooled just like the heating plates. A similar amount is present in the feeding and discharging pipes of the circulating pump and the reversing armatures. The mass of steel for this portion of the apparatus must likewise be heated and cooled. In addition, a considerable amount of electrical energy is required for pumping the heat carrier.

It is an object of the present invention to provide a method of heating and cooling a heat exchanger alternately, which has a considerably lower energy consumption compared with heretofore known methods of this type. It is also an object of the present invention to lower the capital costs for the heating and cooling apparatus for carrying out the method according to the present invention.

SUMMARY OF THE INVENTION

The above-mentioned object had been achieved by providing a method of alternately heating and cooling a heat exchanger in which prior to the last heating-up stage of the heat exchanger the liquid heat carrier present in the heat exchanger and a portion of the conduit system was pressed into a liquid vessel with variable liquid levels and then for the further heating-up and heating of the heat exchanger steam from a steam boiler is fed to the heat exchanger while during the cooling-off stage the heat exchanger and the above-mentioned portion of the conduit system is first filled with liquid from the liquid storage vessel of variable liquid levels.

The apparatus according to the present invention is characterized in that there are means for establishing via the conduit system prior to the last heating-up stage of the heat exchanger a connection between the steam boiler and the storage vessel at variable liquid level via the heat exchanger.

The method according to the present invention operates partly with a liquid and partly with a vaporous heat carrier. In this way, the operating pressure of the apparatus, even with water and steam, can be held to such a low value that the capital costs are considerably lower when compared with an apparatus which uses water as the heat carrier. In this connection it should be mentioned that the main application of the method according to the present invention is with heated presses which are heated to a temperature of 150° C. to 170° C. In order to prevent at such temperatures that water reaches the boiling stage, the system has to be designed for pressures in the area of 22 bar, taking into consideration the storage operations and the loading of the pump. In contrast, with the method according to the present invention pressures from 6 to 9 bar depending on the temperature of the process, are sufficient.

Prior to changing in the last heating stage of the method according to the present invention, to steam as the heat carrier, the liquid heat carrier present in the heat exchanger and in a considerable portion of the conduit system is displaced into the liquid storage container which is at the correct average temperature for this purpose. For the displacement the steam of the steam boiler is preferably used. After the liquid heat carrier has been displaced the press is further heated in the same manner as in the known steam-heated apparatus and is held in the heating phase for the required time at the high temperature. In view of this method of operation a considerable saving in heat consumption and thereby energy is achieved in comparison with the known method. Whereas for instance, with a customary installation heated with hot water, the heat consumption without the heat requirements for the heating plates and the product, which are the same for both methods, amount ot 385.7 kwh per cycle, the heat consumption for carrying out the method according to the present invention with an installation of the same size amounts to 160.7 kwh per cycle. In addition, the consumption of electric energy is reduced from 58 to 19 kwh per cycle.

BRIEF DESCRIPTION OF THE DRAWINGS

The invention is illustrated in the accompanying drawings, in two examples.

Figure 1:
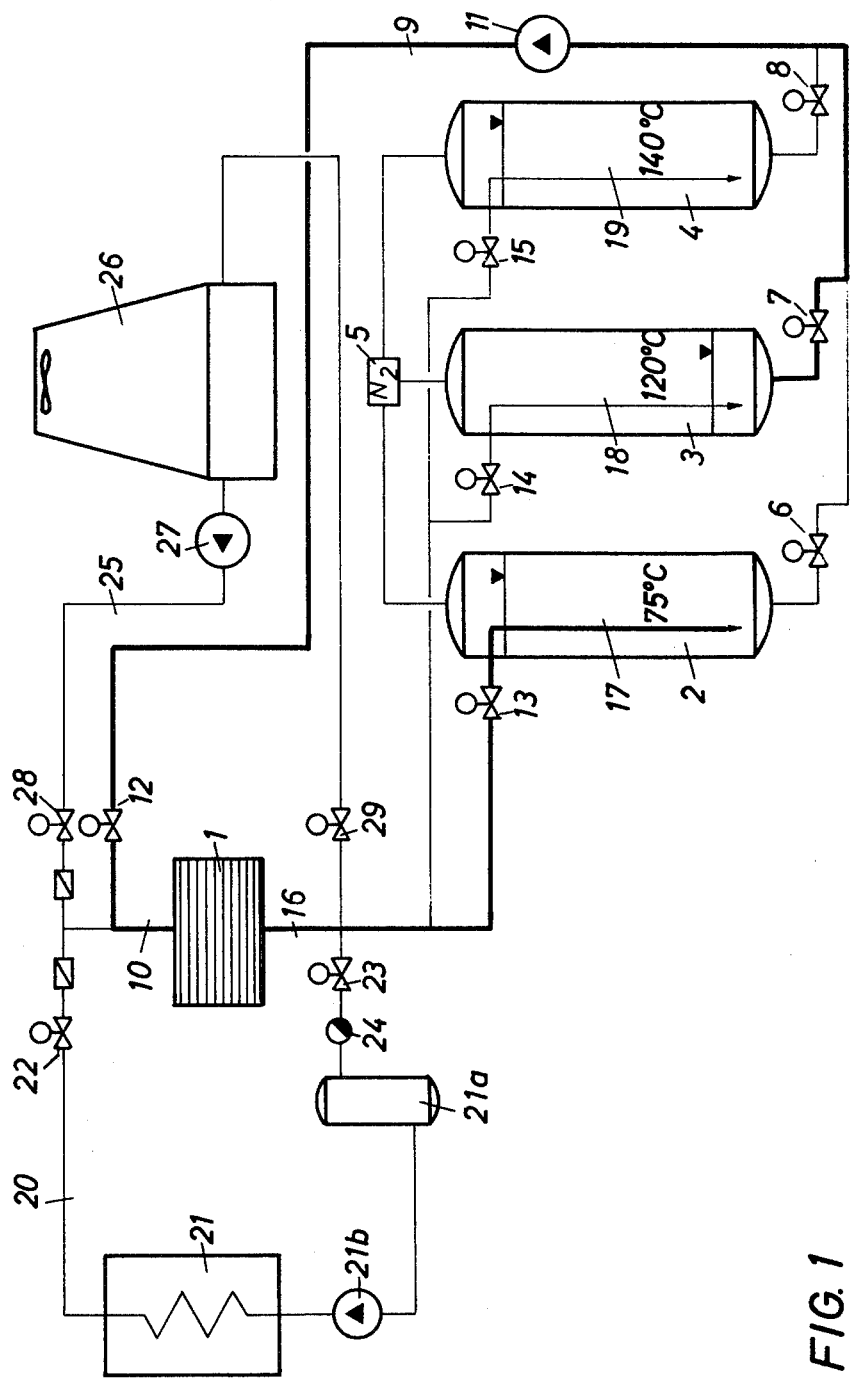
FIGS. 1 to 7 illustrate the individual method steps of a first embodiment of the present invention, in which the conduits used for the heat carrier are shown in heavy lines.
Figure 2:
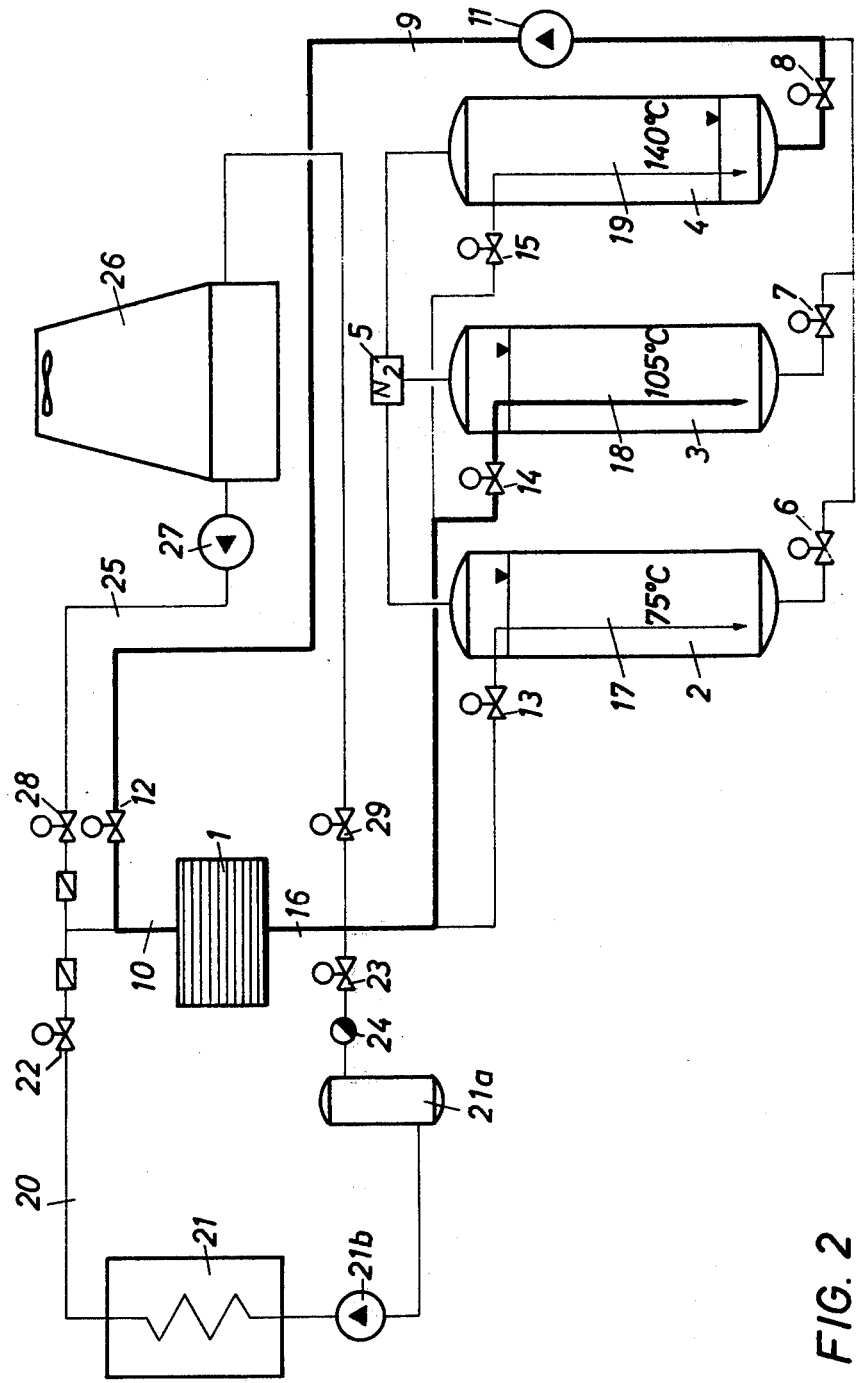
Figure 3:
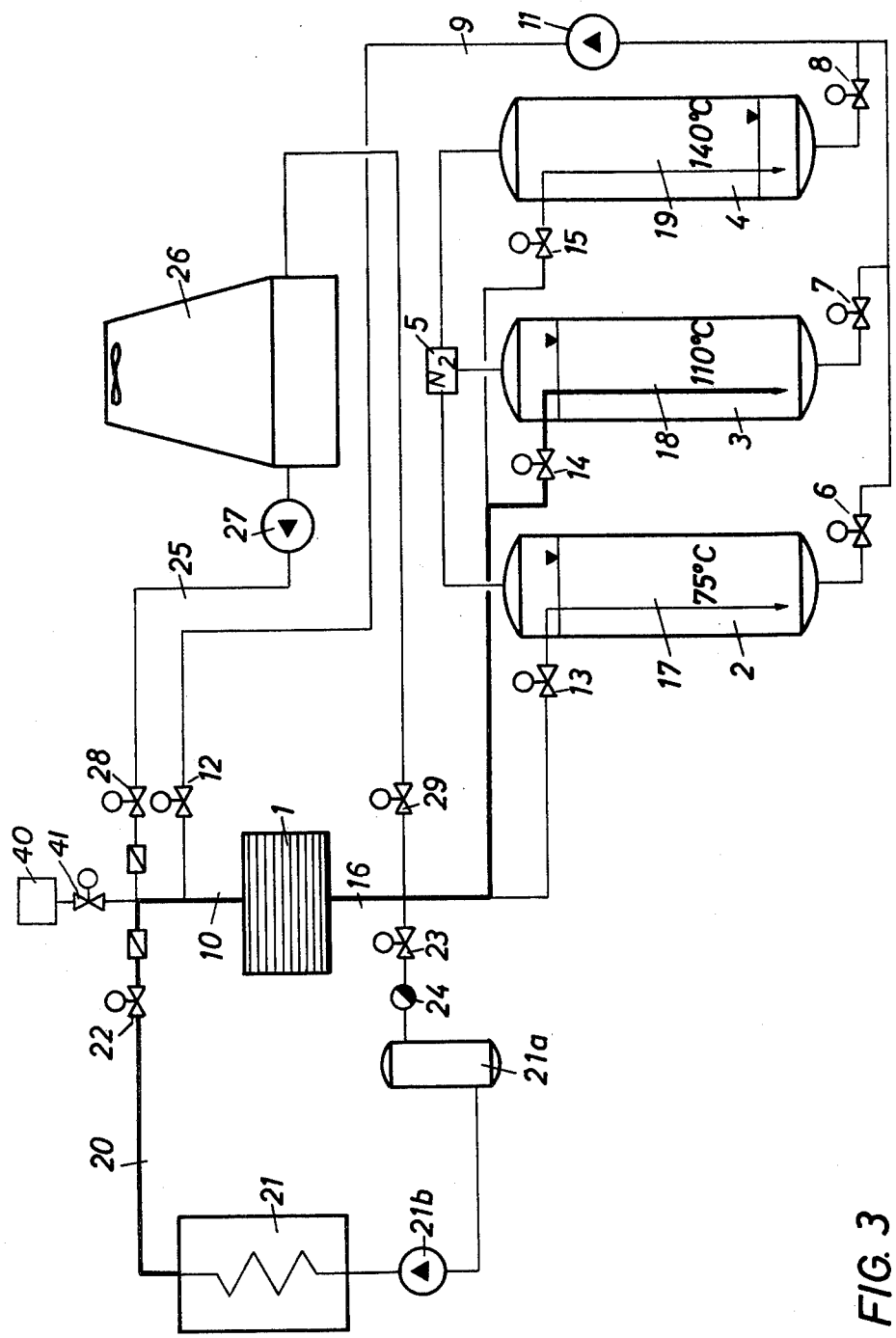
Figure 4:
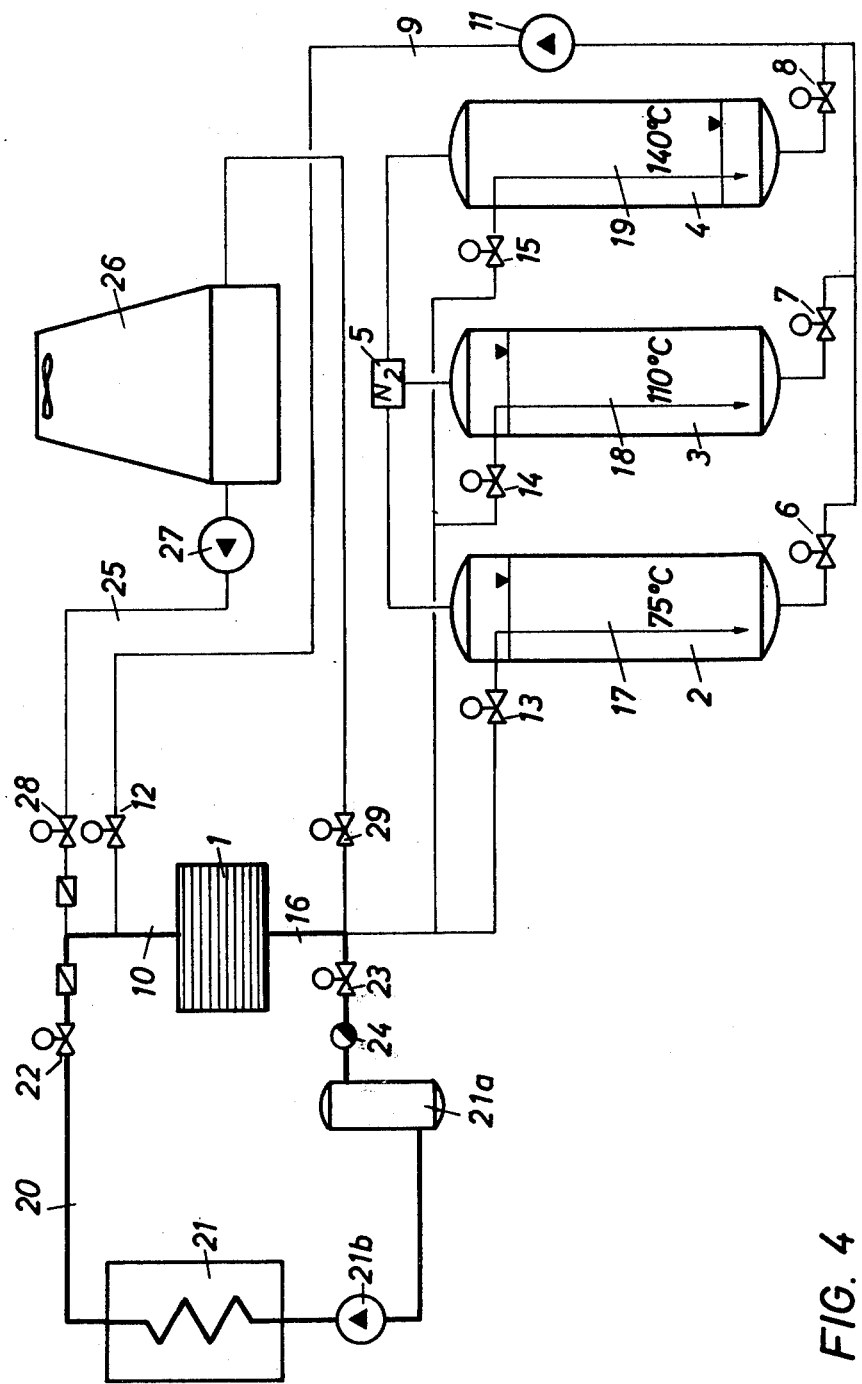
Figure 5:
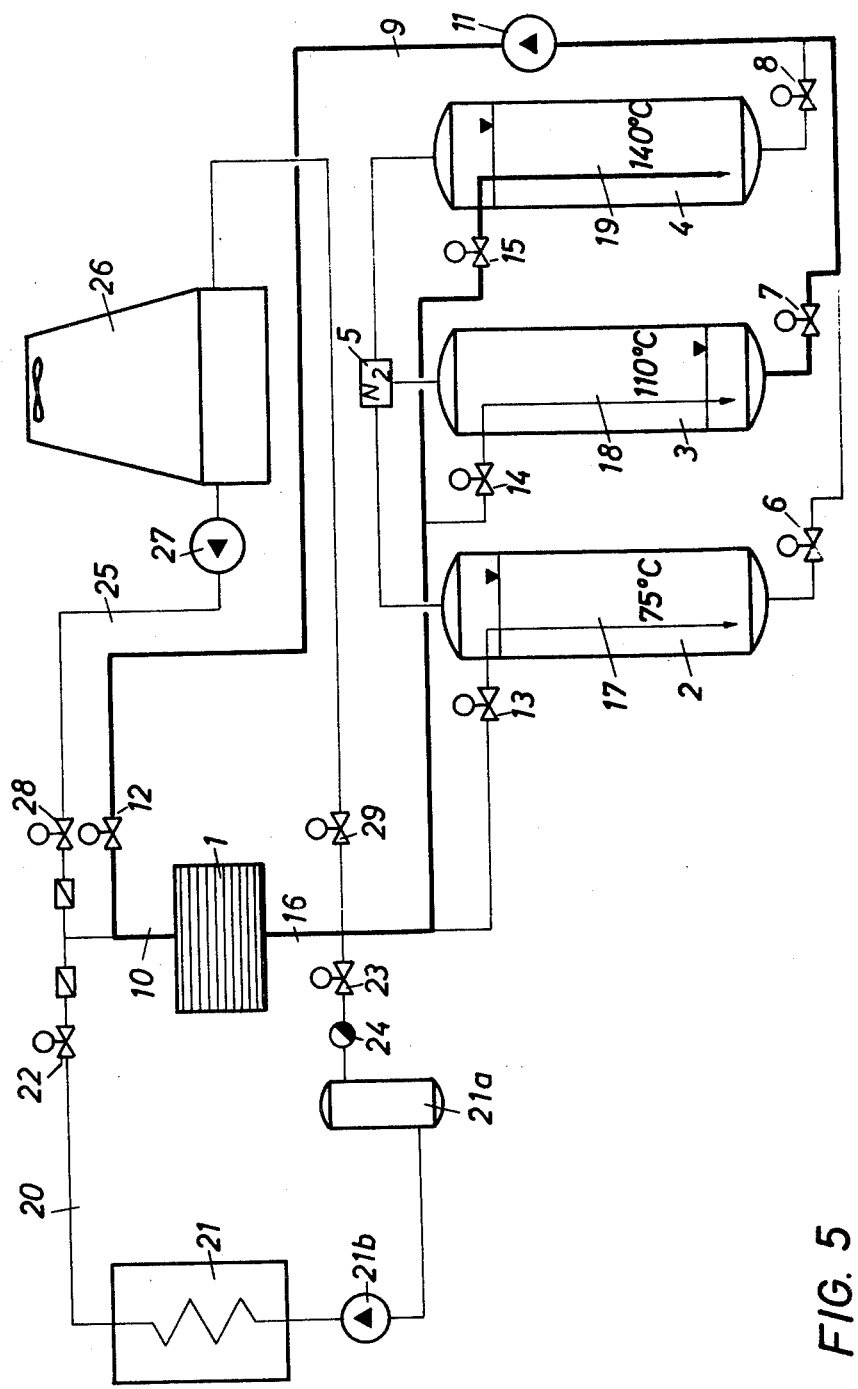
Figure 6:
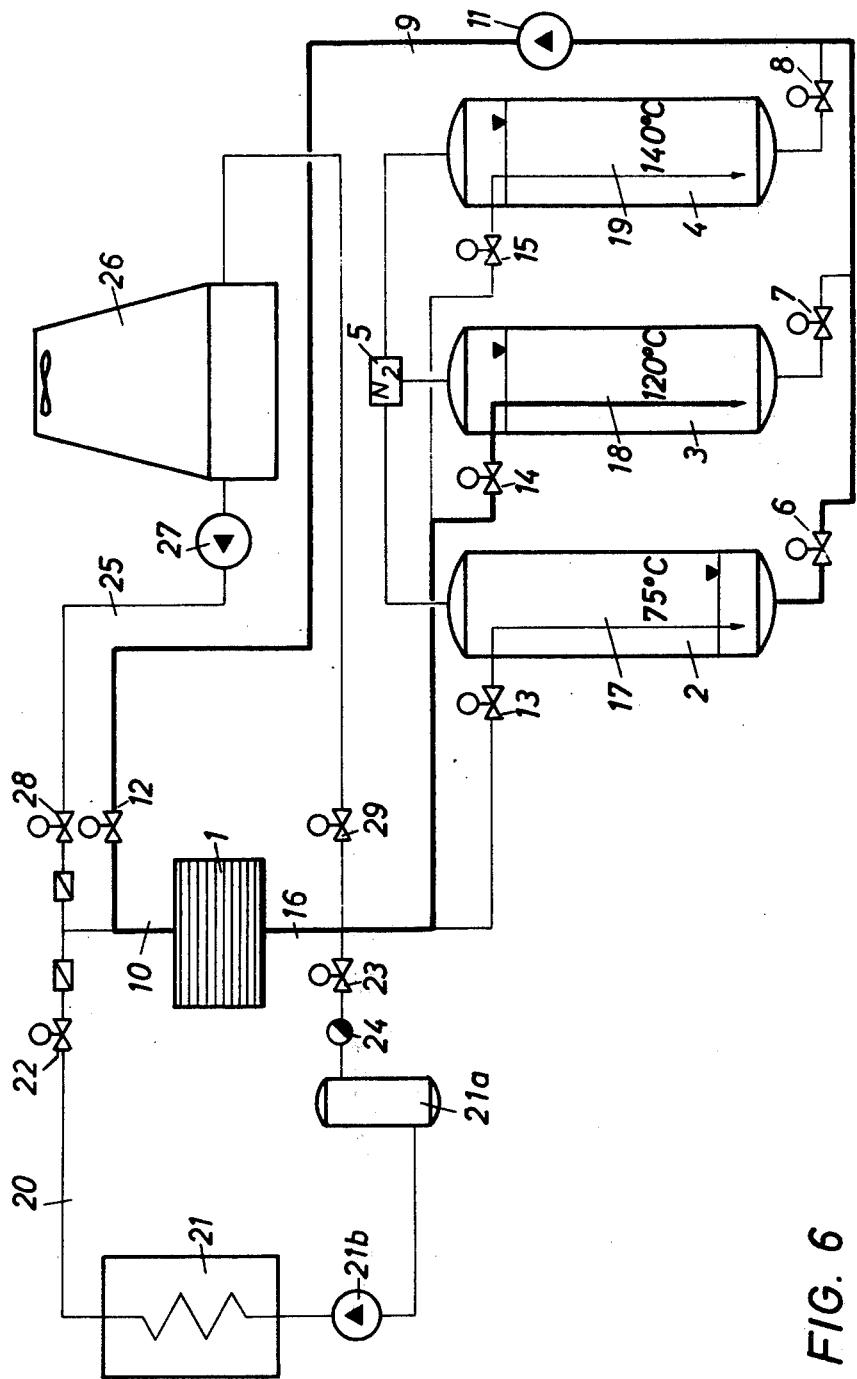
Figure 7:
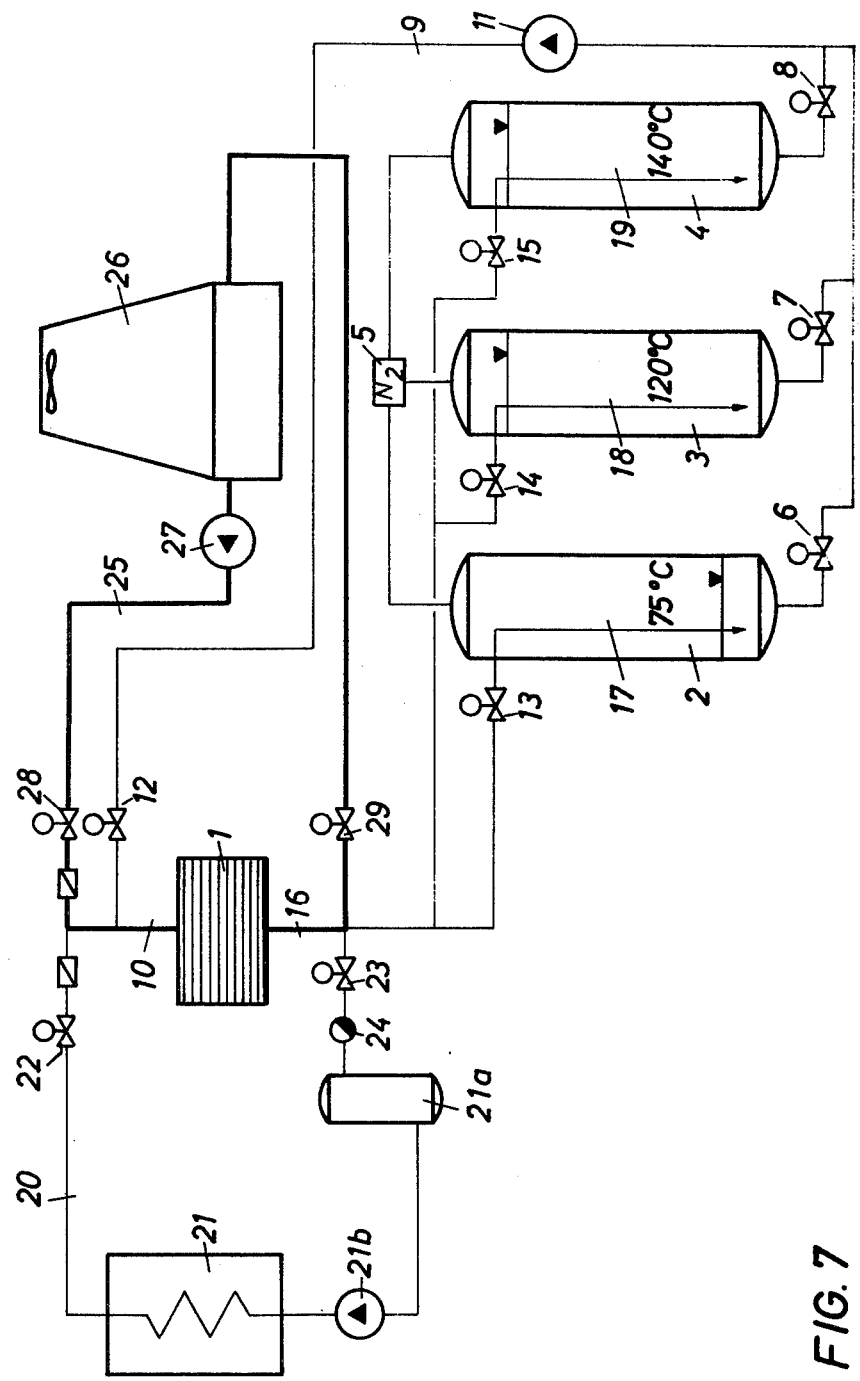

More specifically:

FIG. 1 illustrates the step "Pre-Heating I";
FIG. 2 illustrates the step "Pre-Heating II";
FIG. 3 illustrates the step "Blowing-Through";
FIG. 4 illustrates the step "Heating";
FIG. 5 illustrates the step "Pre-Cooling I";
FIG. 6 illustrates the step "Pre-Cooling II";
FIG. 7 illustrates the step "Cooling".

Figure 8:
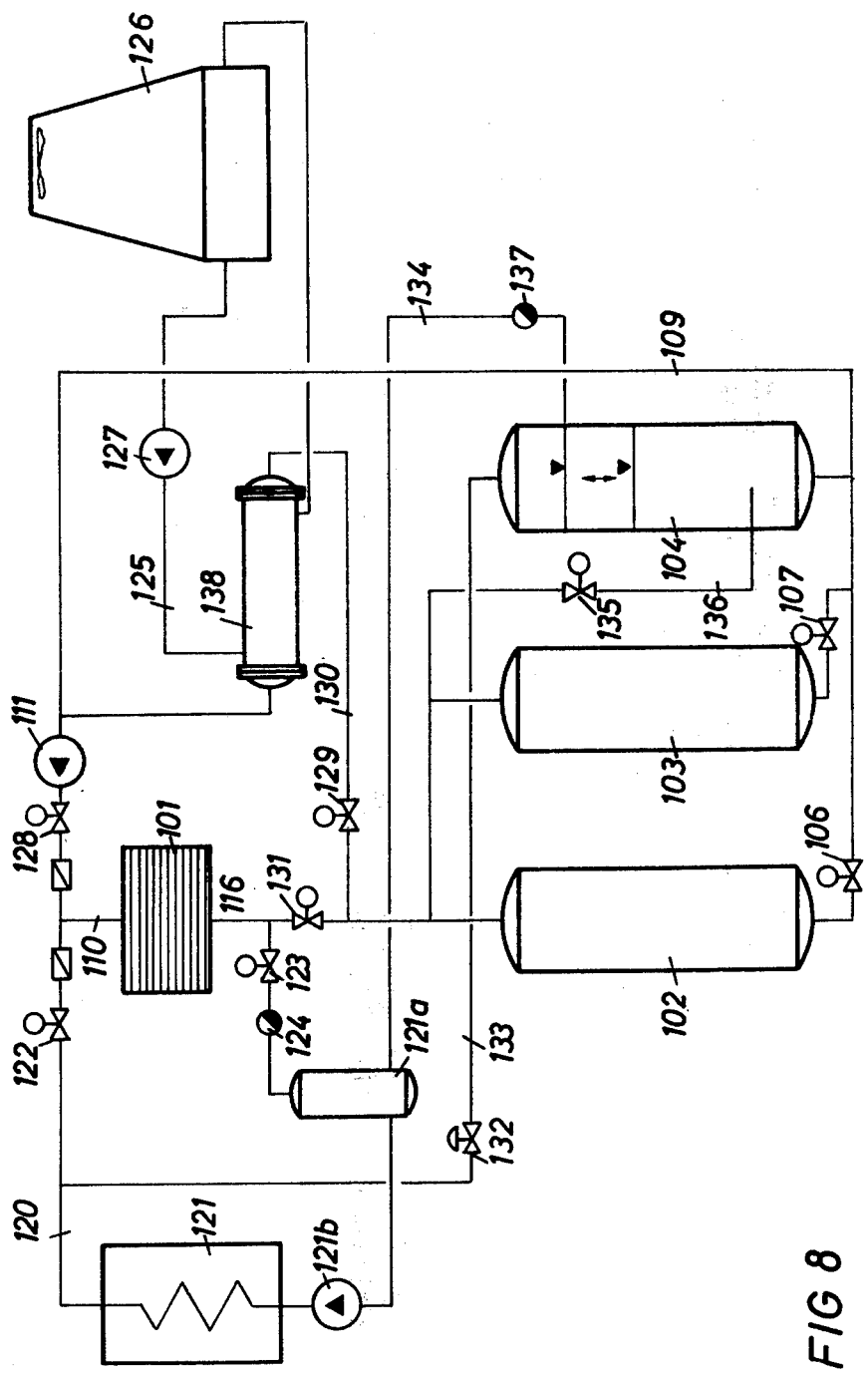
FIG. 8 represents a second embodiment.

FIG. 8 shows a second embodiment in which two storage containers operate according to the displacement principle.

DETAILED DESCRIPTION OF PREFERRED EMBODIMENTS

The heating and cooling installation according to FIG. 1 comprises as a heat exchanger, a multi-layered press 1 which in the course of a working cycle, is heated from 40° C. to 160° C., is held at this temperature for a short period of time and is then again cooled to 40° C. A working cycle takes up about an hour. In known manner, a liquid storage vessel 2 for a low temperature (75° C.), vessel 3 for medium temperature (120° C.) and vessel 4 for high temperatures (140° C.) are provided. The liquid vessels are connected to a source of gas under pressure by means of which the required pressure in the storage vessels is assured in order to prevent a boiling of the liquid, in the present case water. Nitrogen has been selected as the gas under pressure.

The outlet of the liquid storage vessels 2, 3, and 4 are connected to the inlet 10 of a press by means of a conduit 9 via stop valves 6, 7, and 8. A pump 11 is arranged in conduit 9 and a stop valve 12 before the inlet conduit 10. The inlets of the liquid storage vessels 2, 3 and 4 are connected to the outlet 16 of press 1 via stop valves 13, 14, and 15. The inlet conduits of the liquid storage containers extend within the respective vessel downwardly via the pipes 17, 18 and 19 respectively so that even with a vessel almost empty the heat carrier leaving press 1 is fed below the liquid level of the respective storage vessel.

A heating circuit 20 comprises a steam boiler 21, a feedwater vessel 21a, a boiler feeding pump 21b, stop valves 22 and 23 as well as a condensation discharge vessel 24. Instead of the condensation discharge vessel, the pressureless feedwater vessel 21a and the boiler feed pump 21b, a closed condensate vessel with a condensate back feeding pump may be provided in order to avoid energy losses due to evaporation. Such condensate back feeding pump delivers the condensate directly to the steam boiler. The heating circuit 20 may be connected to the inlet 10 or the outlet 16 of the press respectively via the stop valve 22 and 23. Furthermore, a cooling circuit 25 is provided which includes two stop valves 28 and 29, in addition to a cooling tower 26 and a cooling water pump 27.

OPERATION

Be it assumed that the press 1 have a temperature of approximately 40° C. and that the product to be treated thermally has been arranged in the press. The storage vessels 3 and 4 are full, the storage vessel 2 is empty and all valves are closed.

By opening valve 7, 12 and 13, the path of liquid shown in heavy lines in FIG. 1 forms and the first method step "Pre-Heating I" is initiated. The liquid is fed by pump 11 from storage vessel 3 via the press 1 to the storage vessel 2. At the end of the step "Pre-Heating I" the vessels each have approximately the temperatures and levels of liquids shown in FIG. 1.

According to FIG. 2, by closing valves 7 and 13 and opening valves 8 and 14, the path of the liquid shown in FIG. 2 is established which initiates the step "Pre-Heating II". At the end of this step, the vessels achieve the average temperatures and liquid levels indicated in FIG. 2.

Thereafter, the step "Blowing-Through" illustrated in FIG. 3 follows. For this purpose, the valves 8 and 12 are closed and valve 22 is opened. With the steam from boiler 21 the water is discharged from press 1 and conduits 10 and 16 into storage vessel 3, and thereby extensive portions of the apparatus are emptied. This step could also be carried out by means of a separate source 40 of compressed air which may be connected to conduit 10 leading to press 1 (FIG. 3) via a valve 41. It is also possible to feed the water discharged from the press into another storage container.

After the press has been emptied in this manner, in the last heating-up stage, as well as in the heating stage the switch or transfer to steam as the heat carrier. These two steps are illustrated in FIG. 4. With the exception of stop valves 22 and 23, the remaining stop valves are closed. Therefore, the liquid circuit is separated from the steam circuit.

After the temperature of the press has been held for the prescribed duration at the high temperature, the step "Pre-Cooling I" is initiated, which is illustrated in FIG. 5. To this end, valves 22 and 23 are closed and valves 7, 12 and 15 are opened. The press 1 is cooled without temperature shock in a first cooling-off step by the liquid from storage vessel 3, and simultaneously the storage vessel 3 is emptied and storage vessel 4 is filled. FIG. 5 illustrates the temperature conditions and the water level in the storage vessels at the end of this method step.

In the following step illustrated in FIG. 6 and representing "Pre-Cooling II", by closing valves 7 and 15 and opening valves 6 and 14, the press is further cooled by the liquid of low temperature coming from storage vessel 2, and simultaneously the vessel 3 of medium temperature is filled. The temperature and water level at the end of this method steps are shown in FIG. 6.

The last method step of cooling-off illustrated in FIG. 7, again all vessels are separated from the press and instead by opening valves 28 and 29 the cooling circuit 25 is formed in order to cool the press with cooling water from cooling tower 26 to the required low temperature (40° C.). Thereafter, the thermally treated produce is removed from press 1.

In the first embodiment illustrated in FIGS. 1 to 7 storage vessels with variable liquid level are used and liquid is feed from one vessel via the heat exchanger to another vessel, during the heating-up as well as during the cooling-off stage 5. However, the method according to the present invention may also be carried out when using the so-called displacement principle. This variation will now be described in connection with FIG. 8.

In the heating and cooling installation illustrated in FIG. 8, the parts corresponding to those shown in FIG. 1 have the same reference numeral increased by a factor 100. If the function is the same as in the earlier described embodiment it is not being described again here. Of the three liquid storage vessels 102, 103 and 104 to which the lowest, a medium and the highest average temperature are assigned among the storage vessels, all vessels with the exception of vessel 104 where the highest average temperature, operate according to the displacement principle. The storage vessel 104 has a variable liquid level. When heating up the heat exchanger 101 first liquid between the heat exchanger and the liquid storage vessel 102 of the lowest temperature, and then between the heat exchanger and the liquid storage vessel 103 of the next higher temperature is brought into circulation according to the displacement principle. Prior to the last heating-up stage, the liquid is pressed by the steam of the steam vessel 121 out of the heat exchanger 101 and the portion 116 of the conduit system into the liquid storage vessel 104 of the highest average temperature, and is then for the further heating-up of and for the heating of the heat exchanger, steam out of the steam vessel is fed to the latter. During the cooling-off of the heat exchanger 101 the latter and the above-mentioned portion 116 of the conduit system has to be filled first again with liquid from the liquid storage vessel of variable liquid level, i.e. the liquid storage vessel 104. This is followed by the displacement principle in the further cooling stages, i.e. the liquid is brought into circulation according to the displacement principle between the heat exchanger 101 and the storage vessel 103 of the next lower temperature and then between the heat exchanger 101 and the storage vessel 102 of the next lower temperature. The following table illustrates the various circuits during the heating up and cooling off of the heat exchanger, i.e. the press 101.

|  | 106 | 107 | 122 | 123 | 128 | 129 | 131 | 135 |
|---|---|---|---|---|---|---|---|---|
| Pre-Heating I | + | − | − | − | + | − | + |  |
| Pre-Heating II | − | + | − | − | + | − | + |  |
| Blow Through (Emptying the Press) | − | − | + | − | − | − | + | + |
| Heating/Regulating | − | − | + | + | − | − | − | − |
| Filling the Press | − | − | − | − | + | − | − | − |
| Pre-Cooling I | − | + | − | − | + | − | + | − |
| Pre-Cooling II | + | − | − | − | + | − | + | − |
| Cooling | − | − | − | − | + | + | + | − |

Opened = +
Closed = −

It should be mentioned that with the embodiment according to FIG. 8 maintaining the pressure in storage vessel 104 is preferably done with steam and that for this purpose the storage vessel 104 is connected to the steam vessel 121 via a conduit 120, a steam pressure reduction valve 132 and a conduit 133.

Since one or both of the displacement storage vessels 102, 103 are fully filled with water, variations in the volume of the system have to be compensated for in storage vessel 104. Therefore, even with a one-stage installation, i.e. if only one temperature step is provided between heating up and cooling off of the heat exchanger, a second storage vessel (104) is required. The largest variation in the level of the vessel 104 results from the fact that at the beginning of the pre-cooling the heat exchanger is empty and has to be filled first with water. The vessel 104 is approximately half as large as the remaining vessels 102 and 103.

The "Blow-Through" is effected, as evident from the above table, via the conduit 136 and the reverse armature 135 into the water space of the vessel 104. In view of the "Blow-Through" and the condensation process of the steam cushion in vessel 104 at the water surface the volume of the water system increases. The excess amount of water is fed via a condensate discharge 137 and a conduit 134 into the condensate vessel 121a.

Deviating from the showing in FIG. 1, the apparatus in FIG. 8 includes a cooler 138 which makes possible an indirect cooling of the heat carrier. In this way, the water used for the cooling of the press cannot become enriched with oxygen and thereby cause corrosion and in addition, the deposit of hardeners (boiler scale) in the passages of the press is avoided.

What is claimed is:

1. A method of alternately heating and cooling a heat exchanger, such as a press or a reaction vessel, of a heating and cooling installation with heat recovery, and having at least two storage vessels respectively of higher and lower average temperature and a conduit system and a boiler, comprising the steps of:
   feeding liquid of the storage vessel of higher temperature into said heat exchanger for heating-up of said heat exchanger, and for cooling-off of the heat exchanger, feeding into the heat exchanger liquid of said storage vessel of lower temperature,
   feeding steam of a generator directly into the heat exchanger, in the last heating-up stage of the heat exchanger as well as during the heating stage, in which the heat exchanger is held at high temperature,
   prior to said last heating-up stage, displacing the liquid heat carrier present in the heat exchanger and in a portion of said conduit system, into a liquid storage vessel with variable liquid level, and for the further heating-up and heating of the heat exchanger, steam from the steam generator is fed to the heat exchanger, and wherein during cooling-off the heat exchanger and said portion of the conduit system are first filled with liquid from said liquid storage vessel of variable liquid level.

2. A method according to claim 1 wherein all liquid storage vessels are storage vessels with variable liquid level and in which during heating-up liquid from the storage vessel of higher temperature is fed via the heat exchanger into the storage vessel of lower temperature, and during cooling-off liquid from the storage vessel of lower temperature is fed via the heat exchanger into the storage vessel of higher temperature.

3. A method according to claim 1, wherein at least two storage vessels of different temperatures are provided, and wherein only the liquid storage vessel of the highest average temperature has a variable liquid level whereas the remaining storage vessels operate according to the displacement principle, and wherein during heating-up first liquid is brought into circulation according to the displacement principle between the heat exchanger and the storage vessel of lowest temperature, then between the heat exchanger and the storage vessel of the next higher temperature, and during cooling liquid between the heat exchanger and the storage vessel of higher temperature and then between the heat exchanger and the storage vessel of the next lower temperature, according to the displacement principle, and wherein prior to the last heating-up stage the liquid is pressed from the heat exchanger into the liquid storage vessel of the highest temperature, and wherein in the first cooling-off stage the liquid is removed from the latter.

4. The method according to claim 1 or 2, wherein compressed air is used as the gas under pressure for disspelling the liquid heat carrier from the heat exchanger and the conduit system.

5. The method according to any one of claims 1 to 3, wherein prior to the last heating-up stage the liquid heat carrier is disspelled from the heat exchanger and the conduit system by steam from said generator.

* * * * *